(No Model.)
F. L. PERRY.
TWO WHEELED VEHICLE.
No. 301,516. Patented July 8, 1884.
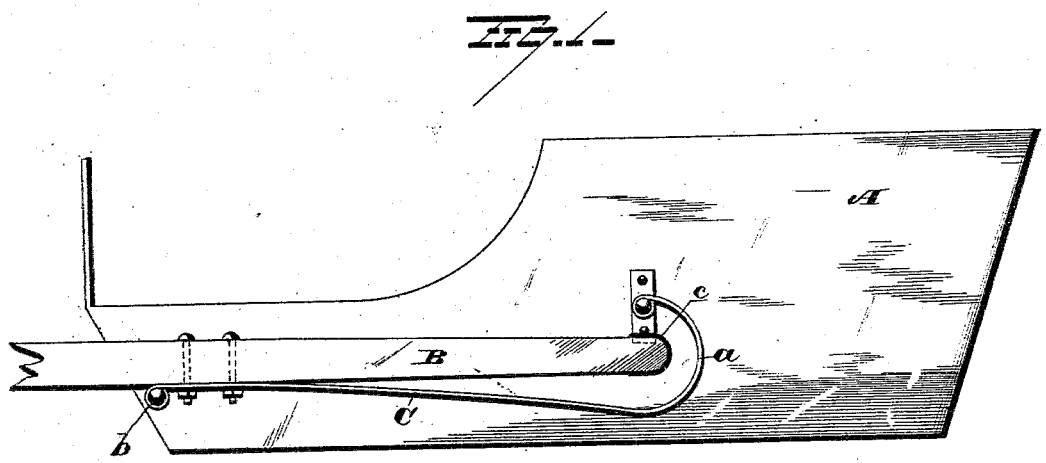
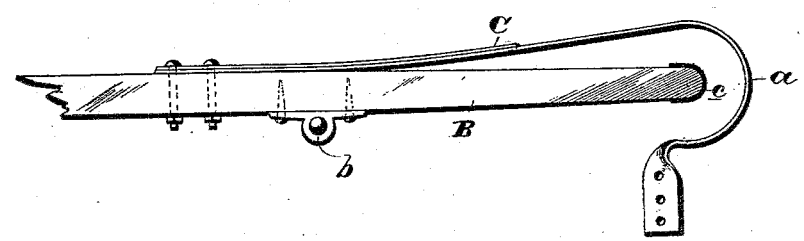
WITNESSES
Geo. F. Downing.
S. J. Nottingham.
INVENTOR
Francis L. Perry.
By H. A. Symons
Attorney
N. PETERS, Photo-Lithographer, Washington, D. C.

UNITED STATES PATENT OFFICE.

FRANCIS L. PERRY, OF BRIDGEPORT, CONNECTICUT.

TWO-WHEELED VEHICLE.

SPECIFICATION forming part of Letters Patent No. 301,516, dated July 8, 1884.

Application filed November 13, 1883. (No model.)

*To all whom it may concern:*

Be it known that I, FRANCIS L. PERRY, of Bridgeport, in the county of Fairfield and State of Connecticut, have invented certain new and useful Improvements in Two-Wheeled Vehicles; and I do hereby declare the following to be a full, clear, and exact description of the invention, such as will enable others skilled in the art to which it appertains to make and use the same.

My invention relates to an improvement in two-wheeled vehicles, the object of the same being to provide vehicles of this type with improved yielding connections between the shafts and vehicle body or frame, whereby the jerking motion usually transmitted through the shafts to the body by the horse are prevented; and with these ends in view my invention consists in the parts and combinations of parts, as will be more fully described, and pointed out in the claims.

In the accompanying drawings, Figure 1 is a view in side elevation of a vehicle embodying my invention, and Fig. 2 is a similar view showing another manner of attaching the spring.

A represents a carriage body or frame, of any desired size and construction, mounted on two wheels by suitable yielding connections, and provided with the shafts or pole-frame B, which latter is pivotally secured thereto near the forward end of the said body. The rear ends of the shafts or pole-frame extend rearwardly any suitable distance either on the inside or outside of the body A, and terminate within the semicircular portion $a$ of the compensating springs C. These free ends of the pole or shafts on opposite sides of the vehicle-body are free to move in unison up and down; but this up-and-down motion is limited to the area between the curved portion $a$ of the spring C. The springs C, which are preferably made in the form shown, are rigidly secured at their forward ends to the shafts or pole-frame, either at or in front or in the rear of the pivotal point $b$. These springs then extend rearwardly alongside of the vehicle-body, under the shafts, and gradually receding therefrom, and curve upwardly and forwardly at their rear end, and are secured to the carriage body or frame, either rigidly or adjustably at a point above the shafts, for the purpose of limiting the rise of the rear ends of the said shafts. Thus it will be seen that by yieldingly connecting the shafts to the vehicle-body the unpleasant motions of the horse are expended in the springs without being transmitted to the vehicle-body, thereby enabling the latter to remain comparatively stationary. The shafts are provided at their rear ends with rubber cushions $c$, as shown. These cushions $c$ not only lessen the shock caused by the ends of the shafts striking against the spring, but also prevent the end of the pole from being damaged by contact therewith and deaden the noise.

In Fig. 2 I have shown the springs C secured to the upper surface of the shafts, and to the vehicle body or frame below the shafts. This arrangement of parts answers the purpose as well as the construction shown in Fig. 1, and can be applied to a vehicle without altering the construction of any of the parts.

If desired, the front end of the spring C can be looped, as shown in Fig. 1, for the purpose of forming the shaft-bearings.

From the foregoing it will be seen that numerous slight changes in the construction and relative arrangement of the several parts might be resorted to without departing from the spirit of my invention; and hence I would have it understood that I do not limit myself to the exact construction shown and described, but consider myself at liberty to make such changes and alterations as fairly fall within the spirit and scope of my invention.

Having fully described my invention, what I claim as new, and desire to secure by Letters Patent, is—

1. In a two-wheeled vehicle, the combination of a vehicle body or frame, shafts or pole-frame pivotally secured thereto, and springs secured at one end to the shafts or pole-frame, their opposite ends being curved around the rear ends of the shafts and secured to the body of the vehicle, substantially as and for the purpose set forth.

2. In a two-wheeled vehicle, the combination of the body or frame, shafts or pole-frame pivotally secured to the body, and springs, the front ends of which are rigidly secured to the shafts in front of the pivotal point $b$, while their rear ends are curved, so as to overlap the rear ends of the shafts, the said rear ends of the springs being secured to the vehicle body or frame, substantially as set forth.

3. In a two-wheeled vehicle, the combination of a body, shafts or pole-frame, and springs secured to the said shafts near their front ends, the extreme front ends of said springs being looped to form the bearings for the shafts, while their rear ends are curved, so as to overlap the shafts, and secured to the vehicle-body or body-frame, substantially as set forth.

4. In a two-wheeled vehicle, the combination, with the body, pivoted shafts, and springs, of yielding cushions encircling the ends of the shafts, substantially as set forth.

In testimony whereof I have signed this specification in the presence of two subscribing witnesses.

FRANCIS L. PERRY.

Witnesses:
GEO. F. DOWNING,
S. G. NOTTINGHAM.